3,216,948
ORGANIC PIGMENTS MADE FROM ORGANIC DYES AND ION EXCHANGE RESINS AND METHODS FOR MAKING SAME
Edward M. Redding, 491 Hill Road, Winnetka, Ill.
No Drawing. Filed Oct. 13, 1961, Ser. No. 144,817
32 Claims. (Cl. 252—301.2)

This application is a continuation-in-part of my copending application Serial No. 847,074, filed October 19, 1959, and now abandoned.

This invention relates to a new type of organic pigment and to processes for making the same.

One object of this invention is to provide a new type of organic pigments over a wide range of color and tone value hitherto unavailable and suitable for coloring printing inks, paints, varnishes, lacquers, enamels, linoleum, rubber, plastics, wax, and coatings.

Another object of this invention is to provide a new type of transparent organic pigment over a wide range of color and tone value.

Another object of this invention is to provide a new type of organic pigment over a wide range of color and tone value which is insoluble in water and in all the usual organic solvents and vehicles.

Another object of this invention is to provide a new type of fluorescent organic pigment over a range of color and fluorescence hitherto unavailable and suitable for use in printing inks, paints, varnishes, lacquers, enamels, linoleum, rubber, plastics, wax, and coatings.

Another object of this invention is to provide organic pigments (or lakes) suitable for coloring foods, drugs and cosmetics over a range of color hithreto unavailable.

Pigments may be defined as substances possessing useful properties because of color, opacity or bulk, and which are insoluble in water and in the vehicle in which they are to be dispersed. Organic pigments are those whose color is contributed by natural or synthetic organic dyestuffs. This type of pigment is that referred to in this application.

Organic pigments available to the prior art are made by several methods from organic dyes. The process of making a pigment from a dye is primarily that of treating the dye (most of which are water soluble) so that the resulting product is insoluble in water and in the vehicles in which it is to be dispersed.

For example:

(a) Some dyes are already insoluble and need only to be dried and pulverized to be used for pigments. Examples are "lithol red" and "para red."

(b) Many dyes are metal or hydrogen salts which are water soluble and ionize in water to form a negatively charged dye anion and one or more positively charged cations. These metal ions are usually sodium or potassium. Dyes like this are called "acidic." Acidic dye salts are made into pigments by dissolving in water and precipitating as *insoluble* salts of metals such as lead, barium, calcium, and copper by adding soluble salts of these metals to the dye solution. These insoluble metal dye salts are generally precipitated with and on some inert mineral base or substrate such as alumina hydrate. The resulting pigment is dried and pulverized, and is known as a "lake" pigment. An example of this type of pigment is a scarlet pigment made by precipitating the acid azo dye Colour Index No. 16150 by precipitation with barium chloride or a lead salt. By Colour Index is meant Colour Index, 2nd Edition, 1956, published by Society of Dyers & Colourists, England, and American Association of Textile Chemists & Colorists.

(c) Many dyes, called "basic" dyes, ionize when dissolved in water to form positively charged dye ions (cations) and one or more negatively charged anions, usually the chloride. This type of dye is usually made into an insoluble pigment by recipitation from solution by the addition of complex acids such as phosphotungstic and phosphomolybdic acid (or a mixture of both), a mixture of tartar emetic and tannic acid, phosphoric acid, arsenic acid, or resinic acid. The resulting precipitate is dried and pulverized or is ground wet and "flushed" in varnish or other vehicle. An example of this type of pigment is a green pigment made by precipitating the basic dye Colour Index No. 42000 with either phosphotungstic or phosphomolybdic acid or both.

(d) There are some dyes which exhibit both acid and basic properties and which can be converted to insoluble form by either of the methods just mentioned.

The above represent the usual commercial methods known to the prior art for preparing organic pigments from organic dyes.

By the methods outlined above, when the dye itself is not already insoluble, the pigment is always made by chemical reaction of the dye with a metal cation or complex anion to form an insoluble chemical compound which is ground to the size range suitable for pigment use. The resulting dye compound is no longer in ionized form, as is shown by the fact that any fluorescence exhibited by the original soluble dye is completely destroyed when the dye is precipitated chemically.

In order to make fluorescent pigments from normally fluorescent orgaic dyes, the prior art has found it necessary to avoid chemical reacting of the dye (which would destroy the fluorescence), but to form "solid" solutions of the dye in resins which are in themselves insoluble. It has been found that the dye retains its fluorescence under these conditions. Several typical methods of preparing the fluorescent pigments according to the prior art are as follows:

(a) A fluorescent dyestuff 4 amino 1,8 naphthal p-xenylimide is dissolved in a butyl alcohol solution of modified urea-formaldehyde and the solution is then polymerized to a glasslike hardness by heating. The product is then ground to −200 mesh size.

(b) A completely polymerized urea-formaldehyde resin is ground to final size and suspended in water. The dye mentioned above is dissolved in the water of the dispersion. The dye then migrates into the resin particles by diffusion and remains there in a solvated condition. The dyed resin particles are then dried and are suitable for incorporation into suitable vehicles.

(c) A somewhat different method available to the prior art of achieving the same general result may be illustrated by mixing together an aqueous solution of a fluorescent organic dye such as the one mentioned above and an aqueous dispersion of a drying oil such as linseed oil, and a resin such as dewaxed shellac plus inert filler such as clay, adding an electrolyte such as sodium chloride to break the dispersion which transfers the dye and resin to the oil phase, separating the water and drying the oil phase. In this case the dye is dissolved in the oil and resin mixture and not chemically combined.

The basic idea of my invention is to make an insoluble pigment by chemically reacting in a polar solvent such as water, ethanol or other lower alkanol solution, a cationic or anionic dye salt with suspended particles of ion exchange material of opposite polarity to form colored pigment particles of relatively high dye content, which are insoluble in water and almost all organic vehicles and solvents; yet, in spite of its polar chemical combination with the ion exchange resin, the dye remains ionized and retains its original color and fluorescence (if any) characteristics. The result is a pigment particle having the insolubility and transparency characteristics of the ion exchange material and substantially the color properties and fluorescence properties (if any) of the original ionized dye salt.

Pigment particles should be below 10 microns in diameter and it is preferred that the particles be in the range below 1.5 microns diameter for printing inks and most other purposes. Therefore, the ion exchange particles used in the preparation must have been ground or formed to the proper size range previous to reaction or be ground to the size range desired during the reaction with the dye. It is necessary to have the original ion exchange particles made in the proper size range prior to reaction with the dye or ground during reaction with the dye because the dye primarily reacts with the exposed surface and with exchange centers near the surface of the ion exchange particles. The smaller particles have more surface available and hence more practically available capacity for reacting with the dye.

Any ion exchange material will meet the requirements of this invention, the choice of material being dictated by cost, availability, exchange capacity or other consideration not pertinent to the invention itself. From a practical standpoint an exchange capacity of at least 0.5 m. eq./g. dry material is preferred in order to manufacture pigment products in the commercially acceptable range of dye concentration of over 5% dye by dye weight of the product.

There are a very large number of dyes already known which are suitable for use in the process covered.

This invention covers the use of all organic dyes which are of this invention soluble and ionized in solution. These dyes are generally classed by usage in the dyeing industry. The water soluble colored dyes fall into the usage classes called "basic" or "acid" ("acidic"). There are two classes of dyes used for the direct dyeing of cotton, called "direct" dyes, and "mordant" dyes which in turn can be classified as basic or acidic dyes. In addition this invention covers the use of the solubilized forms of sulfur dyes and vat dyes, the final color of the dye being obtained by an oxidization of the pigment particles. This also applies to the water soluble leuco esters of vat dyes. Alternatively, dyes can be classed according to their chemical constitution. The following table indicates some examples of suitable dyes arranged by the generally accepted chemical class and type of ionization:

| Commercial name: | Colour Index No. |
|---|---|
| Naphthol Yellow S | CI 10316 |
| Auramine O | CI 41000 |
| Malachite Green | CI 42000 |
| Setoglaucine | CI 42025 |
| Commercial name—continued | Colour Index No. |
| Erioglaucine A | CI 42090 |
| Alkali Blue | CI 42765 |
| Rhodamine B | CI 45170 |
| Pyronine G | CI 45005 |
| Eosin YS | CI 45380 |
| Sulfonated nigrosine | CI 50420 |
| Erythrosine | CI 45430 |
| Violamine R | CI 45190 |
| Orange II | CI 15510 |
| Tartrazine | CI 19140 |
| Thioflavine T | CI 49005 |
| Astraphloxine FF Extra | CI 48070 |
| Quinoline Yellow SS | CI 47005 |
| Alizarine Saphirol B | CI 63010 |
| Carminic acid | CI 75470 |
| Soluble copper phthalocyanine | CI 74220 |
| Acridine Orange NO | CI 46005 |
| Safranine T | CI 50240 |
| Rosinduline GG | CI 50120 |
| Meldola's Blue | CI 51175 |
| Sirius Supra Blue FFRL | CI 51320 |
| Methylene Blue | CI 52015 |
| Brilliant Alizarin Blue 3R | CI 52055 |
| Indigosol O | CI 73002 |
| Primulin | CI 49000 |

Ion exchange materials are high molecular weight cross-linked polyacids or polybases which are virtually insoluble in most aqueous and nonaqueous media. Cation exchangers can contain nuclear sulfonic, methylene sulfonic, phosphonous, phosphonic, phosphoric, carboxylic, or phenolic hydroxyl groups. Anion exchangers can contain primary, secondary, tertiary amine, quaternary ammonium, sulfonium, phosphonium, arsonium, or stibonium groups. These reactive groups are highly ionized in water and other polar solvents and hence the resins act as insoluble but ionized salts. Hence they are capable of reacting with other ionized salts in water or in other polar solvent such as alcohol, the result being an exchange of cation or anion (depending on the type of exchanger) attached to the reactive group in question. Since the dyes mentioned previously are generally in the form of a soluble hydrogen or alkali metal or chloride salt, ionized in water, the dye is actually an ion when

TABLE I

| Chemical Class | Cationic (basic) | Anionic (acidic) | Mixed |
|---|---|---|---|
| Anthraquinone | | Alizarin Saphirol B | |
| Nitro | | Naphthol Yellow S | |
| Diphenylmethane | Auramine O | | |
| Triphenylmethane | Malachite Green | Erioglaucine A | |
| Triphenylmethane | Setoglaucine | Alkali Blue | |
| Xanthene | Rhodamine B / Pyronine G | Eosin YS | Violamine R. |
| | | Erythrosine | |
| Azo | | Orange II / Tartrazine | |
| Acridine | Acridine Orange NO | | |
| Azine | Safranine T | Rosinduline GG | |
| Oxazine | Meldola's Blue | Sirius Supra Blue FFRL | |
| Thiazine | Methylene Blue | Brilliant Alizarin Blue 3R | |
| Solubilized vat dyes, indigoid | | Indigosol O | |
| Miscellaneous: | | | |
| Quinone-imido | | Sulfonated nigrosine | |
| Thiazole | Thioflavine T | Primulin | |
| Polymethine (cyanine) | Astraphloxine FF Extra. | | |
| Quinoline | | Quinoline Yellow S | |
| Phthalocyanines | | Soluble copper phthalocyanine | |
| Natural colors | | Carminic acid | |

The dyes in the above table are listed under their commercially accepted names. Colour Index numbers of these dyes are listed as follows for positive identification:

dissolved in water and capable of exchange with the ions attached to the reactive groups of the ion exchange materials. Experiments have shown the truth of this statement, and it has been found that a wide variety of water soluble, ionized dyes react with and attach themselves in ion form to ion exchange materials, thereby forming an insoluble salt.

Although all types of ion exchange materials are suitable for the purposes of this invention, the materials preferred are synthetic organic resins described as (1) strongly basic anion exchangers (quaternary ammonium, sulfonium, phosphonium, arsonium, or stibonium groups), and (2) strongly acid cation exchangers (sulfonic groups). These ion exchange resins can be prepared in many ways known to the art but those most in use at this time, and commercially available, are prepared synthetically by activation of a cross-linked polymer of styrene, of acrylic or methacrylic acid, of phenolformaldehyde, or of an epoxy-polyamine condensate. One well known type of ion exchange resin is prepared by copolymerization of styrene plus variable amounts of divinylbenzene or ethylene-dimethacrylate (as a cross-linking agent) according to the disclosures of U.S. Patent No. 2,366,007. The copolymers are made by suspension polymerization of styrene and divinylbenzene (or ethylene dimethacrylate). The active ionic groups are introduced then into the resulting copolymer particles. To form strongly acid cation exchangers with sulfonic groups the copolymer is sulfonated by treating with hot concentrated sulfuric acid. Neutralization with soda ash and washing complete the process. Examples of commercially available strong acid cation exchange resins made by this process are Dowex 50 from Dow Chemical Company and Duolite C-20 from Chemical Process Company.

To form one type of a strongly basic anion exchanger the above copolymer is chloromethylated with methyl chloromethyl ether and a Friedel-Crafts type catalyst, followed by amination with a tertiary amine such as trimethyl amine. This forms quaternary ammonium salts which ionize into chloride and insoluble resin ions. This is in accordance with disclosures in U.S. Patent No. 2,591,573. Examples of strongly basic anion exchange resins available commercially and made by this process are Dowex 1 and the Rohm and Haas resins IRA–400.

In a more recently developed technique a strongly basic anion exchange resin is made as follows: Linear polystyrene beads are cross-linked following polymerization, after which anion exchange groups are attached to active side chains in the polymer, in accordance with disclosures in U.S. Patent No. 2,900,352. A commercially available resin of this type is Duolite A-101D.

Other types of ion exchange materials have been developed, but are less important commercially at this time. However, their general behavior is the same as described and they are usable for the purposes described in this disclosure. One of the first organic materials found capable of cation exchange was obtained by sulfonating bituminous coal. Later phenolformaldehyde resins were sulfonated to form cation exchange resins, and the same type of resin was found to be suitable for anion exchange resins. The method of preparation of both of the latter types is described in U.S. Patent 2,389,865. Another commercially available ion exchange material is inorganic in nature and is prepared from silicious materials of various sources.

So-called weak acid cation exchangers are generally made by incorporating carboxylic groups into a resin matrix as described in U.S. Patent No. 2,340,111. A commercial example is Duolite CS-101. Cation exchange resins having properties intermediate between the "strong acid" and "weak acid" resins are usually made by incorporating either phosphoric acid, phosphonous acid, or phosphonic acid groups into resin matrices. U.S. Patent No. 2,844,546 describes the preparation of a representative ion exchange resin of this type which contains the phosphonous acid group. An example of a commercial resin of this type is Duolite ES-62.

Most synthetic ion exchange resins are made by attaching active groups to preformed polymers. Another method used commercially is that of forming the ion exchange resin by a one-step condensation. An example of this type is described in U.S. Patent No. 2,469,683, the resin being of the epoxy-polyamine type, of which Duolite A-30B is a commercially available example. Although any type of ion exchange material is suitable for use in the processes covered by this invention, the strong-acid and strong-base styrene based synthetic ion exchange resins are preferred over the other known ion exchange materials because they can be varied in composition in a wide degree, the particles can be produced in spherical form, are more stable to heat and oxidizing agents, have higher capacities for the dye ions under most conditions, and have a strong attraction for dye ions over the entire pH range of approximately 0 to 14.

The advantages of the pigments prepared by my methods over the pigments known to the prior art include the following:

(1) Essentially all known dyestuffs have water soluble, ionized salts can be used, resulting in a very wide variety of pigments insoluble in almost all solvents and vehicles. These pigments tend to be transparent.

(2) The color and fluorescence properties of the soluble dye salt used in the preparation are essentially retained in the insoluble pigment.

(3) The pigments are readily wetted and dispersed by the flushing process or as dry pigments in all of the commonly used vehicles.

(4) The pigment particles should be in the size range under 10 microns diameter but preferably under 1.5 microns, the size either being determined by the particle size of the ion exchange resins used or the pigment can be ground to the proper size during the reaction with the dye.

(5) The color tone rane of the pigments can be varied without the addition of extenders by varying the proportion of dye salt to ion exchanger resin up to the point of practical saturation of the resin by the dye salt. Useful pigments are made by this method when the amount of attached dye in the final product is over 5% by dry weight basis.

(6) The new process of pigment preparation makes possible the use of acidic fluorescent dyestuffs as well as basic.

(7) The method makes possible the production of satisfactory pigments from natural dyestuffs which have met the requirements of being water soluble and ionized.

(8) Colors and fluorescence can be varied by using mixtures of dyestuff salts in the preparation of the pigments, each pigment particle having ions of each dye chemically attached to its reactive groups in the ratio desired, up to the practical saturation point.

(9) The method of pigment preparation is relatively simple, requiring standard type equipment, a short elapsed time and relatively little labor.

My invention differs from the prior art in that my process results in an essentially insoluble finely divided organic pigment of high tone strength whose coloring and fluorescence (if any) are imparted by dye ions which, although firmly bonded chemically to the synthetic resin, remain in an ionized chemical state. This gives the pigment particle the same general color and fluorescence imparting properties as the original dye in water solution. This is made possible by the use of ion exchange materials which have the action of being the precipitating (insolubilizing) agent in the reaction in which the pigment particle is formed. The prior art uses methods of organic pigment formation which result in the dye being either (a) Basically insoluble in the first place,
(b) Precipitated in the form of an insoluble, un-ionized salt, or
(c) Dissolved in a solid resin particle.

The following examples, in which all parts are by weight, are presented in order that the preparation and properties of the products of this invention may be thoroughly understood and recognized. The examples are not to be taken, however, as limiting this invention.

*Example 1*

This is to illustrate the preparation of a red pigment using an acidic dye and a strongly basic synthetic anion exchange resin. This pigment has a fluorescence when irradiated with ultraviolet light.

The synthetic anion exchange resin used in this example is an insoluble polybase characterized as the chloride salt of the quaternary base form of the chloromethylated copolymer of styrene, divinyl benzene and ethyl benzene. The resin known commercially as Dowex-1 was prepared according to the example of U.S. patent to McBurney, 2,591,573, but the description of the method will not be repeated herein the interest of brevity. In this case, composition of the copolymer was 97% styrene, 2% divinyl benzene, and 1% ethyl benzene. As originally prepared, the resin had a moisture content of 75% by weight and had an exchange capacity of 4.3 m. eq./dry grams. The resin was ground by hand until average particle size was less than 10 microns in diameter. 1.00 grams of resin after grinding was weighed into a beaker and stirred into 100 cc. of water.

0.43 gram of Eosin YS was dissolved in approximately 100 cc. of water and the solution added dropwise to the stirred slurry of resin in water. After 3 minutes a drop of slurry on filter paper showed essentially no excess dye present. As the last of the dye was added the particles started to agglomerate. Agglomerated particles were filtered and kept moist. Particles were dark red in color, transparent, and gave a yellowish fluorescence in direct or reflected sunlight or in ultraviolet light.

*Example 2*

This is to illustrate the preparation of a green pigment, using a basic dye and a strongly acid cation exchange resin.

The synthetic cation exchange resin used in this example known commercially as Dowex-50 is an insoluble polyacid, characterized as the sulfonated copolymarizate of styrene and divinyl benzene in the hydrogen salt form, prepared by the method of Example 1 of U.S. patent to D'Alelio, 2,366,007. The resin as prepared had 70% moisture by weight, an exchange capacity of 5.2 m. eq./ dry grams. It was ground until average particle size was less than 10 microns. 1.00 grams of resin was weighed out and stirred in about 100 cc. of water. 0.20 gram of Malachite Green Hydrochloride was dissolved in 100 cc. water and added dropwise to the stirred resin slurry. As the last of the dye was added the particles began to agglomerate. After 5 minutes a drop of slurry on filter paper showed a slight amount of excess dye present. Agglomerated particles were filtered and examined in moist state. They appeared to be dark green and transparent and suitable for flushing into a suitable vehicle such as boiled linseed oil.

*Example 3*

This is to illustrate the preparation of a red pigment, using a basic dye and a weakly acid cation exchange resin of the acrylic type.

The resin used in this example is a sodium salt form of an insoluble polyacid having the carboxylic acid group as the active functional group. The resin, known commercially as Duolite CS-101, was prepared by copolymerizing in suspension acrylic acid plus a few percent divinylbenzene according to U.S. Patent 2,340,111. As originally prepared, the resin had a moisture content of 69.4% by weight and a total exchange capacity of 10.2 m. eq./g. dry weight (published information). 100 grams of this resin were weighed out and placed in a laboratory pebble mill with about 100 cc. of water. It was ground for 24 hours, and the resin slurry was then diluted to about 1000 cc. with water.

About 50.0 grams of Rhodamine B (C. I. 45170) were dissolved in about 1500 cc. of water at about 200° F. and the solution cooled. The dye solution was added slowly to the stirred resin slurry to an endpoint determined jointly by initiation of agglomeration of the particles and by spot test on filter paper. At this point 30 grams of dye had been used. Pigment particles were filtered and a slight excess of dye noted in the filtrate. Pigment particles were red in color and showed fluorescence when subjected to ultraviolet radiation.

Further examples: In order to illustrate the use of various types of ion exchange resins in reaction with typical dyes, the following summation of experimental data is presented. The procedure in weighing, grinding, mixing, and reaching an endpoint is the same in each case and is as described in Example 3 above.

| Ex. | Type of resin | Trade name of resin | Type of dye | Example of dye | Wt. dye, gram | Wt. resin g. (dry) |
|---|---|---|---|---|---|---|
| 1 | Strong base anion exchange (quaternary ammonium-polystyrene). | Dowex 1-X2 | Acid | Eosin YS, CI 45380 | 0.43 | 0.25 |
| 2 | Strong acid cation exchange (sulfonated polystyrene). | Dowex 50 | Basic | Malachite Green hydrochloride, CI 42000. | 0.20 | 0.30 |
| 3 | Weak acid cation exchange (carboxylated crosslinked polyacrylate). | Duolite CS-101 | do | Rhodamine B, CI 45170 | 10.0 | 30.6 |
| 4 | Intermediate acid cation exchange (polystyrene-phosphonous acid). | Duolite ES-62 | do | do | 25.0 | 55.0 |
| 5 | Intermediate acid cation exchange (phenolic-phosphoric acid). | Duolite ES-65 | do | do | 12.0 | 55.0 |
| 6 | Weak base anion exchange (phenolic-amine). | Duolite A-7 | Acid | Eosin YS, CI 45380 | 20.0 | 50.0 |
| 7 | Intermediate base anion exchange (epoxy polyamine quaternary ammonium-tertiary amine). | Duolite A-41 | do | do | 28.0 | 50.0 |
| 8 | Strong base anion exchange (quaternary ammonium polystyrene). | Duolite A-101D | D & C acid | D & C Orange No. 3, CI 16230. | 40.0 | 51.7 |
| 9 | Strong acid cation exchange (sulfonated polystyrene). | Duolite C-25 | D & C basic | D & C Red No. 19, CI 45170. | 43.0 | 55.0 |
| 10 | Intermediate acid cation exchange (polystyrene-phosphonic acid). | Duolite ES-63 | Basic | Rhodamine B, CI 45170 | 27.0 | 55.0 |
| 11 | Strong acid cation exchange (polystyrene-sulfonium). | Duolite ES-105 | do | do | 24.0 | 55.0 |
| 12 | Strong acid cation exchange (sulfonated coal). | Zeo-Karb HI | do | do | 10.0 | 80.0 |
| 13 | Strong acid cation exchange (sulfonated phenolic). | Duolite C-10 | do | do | 10.0 | 30.0 |

The compositions of the final products shown represent examples of practical saturation values under conditions of the particular grinding conditions used and hence represent no inherent limitations on the method.

When less than the practical saturation ratio of dye to resin is used, it has been found helpful to add the dye solution in small increments to the stirred slurry of ion exchange particles. This is done in order to get an even amount of dye over every ion exchange particle. If the exchange particles were added to the dye solution, the first particles added would have a greater amount of dye than those added last, giving a product lacking homogeneity. An alternate scheme would be to add the slurry and dye solution together in proper ratio in a continuous process. When saturation amount of dye or an excess of dye is used, the method of adding dye or mixing is not important, as each resin particle becomes uniformly reacted with dye.

It was found by experimentation that the dye-resin reaction was not instantaneous as the practical saturation amount of dye on the particular resin particles was approached. It was found that as much as one to five minutes or even more of vigorous stirring was required before the last 5 to 10% of dye reacted with the resin. The reason for this time interval is not known, but it is probably the time required for the dye molecules to diffuse into the interior of the porous resin particles and react with the reactive groups there. The time interval is a function of type of resin, size of dye molecule, type of dye molecule, size of resin particle, porosity of resin and degree of stirring.

The method usual to the industry of recovering the pigment particles from the dilute slurry is that of filtration. Because of the very small size of the ultimate pigment particles, filtration on a practical basis is relatively difficult without some agglomeration of the particles. It is a preferred step in my process to promote the desirable agglomeration by adding dye solution to the resin slurry until no more dye reacts, then adding a slight excess of dye (from 0 to 10% excess) at which point a visible agglomeration occurs and the pigment agglomerates start to settle out of the solution. The pigment can be allowed to settle, the supernatant dye solution decanted off and the solid particles filtered and washed in the usual ways known to the art. Under conditions where less than the saturation value of dye is added to the resin in order to obtain a given color tone the agglomeration does not occur and filtration is more difficult. Other methods of solid-liquid separation known to the art, such as centrifugation, can be used in this case.

The reaction of dye with ion exchange material can take place, in general, with pH of solution between 0 and 14. This usable range of pH varies, however, for each dye and type of ion exchange material used, and must be determined experimentally for each dye, if it is desired for any reason to depart greatly from near neutrality or pH of 7, the preferred acidity for reaction. The principles which govern the selection of the usable range of pH are clear, however. This range could be defined as the one in which the affinity of the dye for the ion exchange material is sufficiently greater than the affinity of the hydrogen ion (in the case of basic dyes) or the hydroxyl ion (in the case of acidic dyes) that the dye is not eluted from the ion exchange material to a noticeable extent.

However, either extreme acid or basic pH ranges at higher solution temperatures would have the tendency to degrade the dye through hydrolysis. Hence it is desirable to use dye solutions in the near neutrality range from 5.0 to 9.0 at temperatures below approximately 125° F.

The reaction between dye and resin take place at any temperature between 32° F. (freezing temperature of water) and 250° F. (in case of cation exchange resins) and 150° F. (in case of anion exchange resins). The upper limits are practical temperature limits set by the resin manufacturer. The 250° F. temperatures would be usable only under pressure enough to keep water liquefied. A temperature of 60° F. to 100° F. is preferred only because of convenience in handling.

The rate of reaction and equilibrium is independent of pressure and largely independent of dilution of the dye and slurry.

The theoretical maximum ratio of dye to resin is that at which all the dye reacts with all the reactive groups available on the surface and interstices of the resin. This can be said also as the ratio at which the equivalents of dye are equal to the exchange capacity of the resin. Because of the nature of the dye molecule, it is assumed for purposes of calculation that only one reactive group of each dye molecule is able to react with the resin, although this may not always be the case in actual practice. Hence the equivalent weight of the dye is assumed to be the molecular weight. Also, because of the relatively large size of the dye molecule and consequent blocking effects it appears that all the reactive groups on the resin surface are not necessarily satisfied at the point where no more dye will react. Hence, the theoretical maximum ratio of dye to resin is generally not achieved in practice, particularly with resin particles of sizes larger than 3 microns. Experiments have proved conclusively that the amount of dye which reacts with a given type of ion exchange material is affected greatly by resin particle size as well as by the size of the dye molecule. For instance, the practically achievable dye-resin ratio of a dye of low molecular weight such as Thioflavine T with a resin of a given particle size would approach the calculated theoretical maximum closer than that of a larger dye molecule such as Malachite Green with the same resin of same particle size. A sample calculation is as follows:

Resin is Dowex 50. Exchange capacity is published as 4.9 m. eq./grams dry resin (or 0.0049 equivalent per gram). Dye is Rhodamine B (molecular weight=equivalent weight=419.5).

For 1 gram dry resin, maximum weight of reacted dye=0.0049×419.5=2.06 grams.

Theoretical maximum ratio=2.06 g. dye/g. resin.

The experimentally achieved dye-resin ratio for a resin of about 10 microns diameter was found to be about 1.09 Rhodamine B/g. dry Dowex 50. The theoretical maximum ratio of dye to resin is approached as particle size of resin becomes sufficiently small to expose almost all reactive groups to the dye. The use of an excess of dye over the actual saturation value results in wasted dye which does not react with resin. However, for pigments of maximum tone strength the percentage dye content should be as high as saturation will permit. For useful pigments of high tone strength the amount of dye used should be above 5% by weight of the dry pigment product. Below 5% of dye results in pigments of such low color strength that they are of little or no commercial interest. There is an upper value of about 90% dye for the pigment composition range, which represents the approximate maximum possible value, if there were complete saturation of high capacity resin with a dye of very high molecular weight. Actually, in commercial use the range is from about 10% to about 75%.

I claim:

1. The method of forming a substantially insoluble organic pigment which comprises reacting a dye salt selected from the group consisting of cationic and anionic organic dye salts dissolved in a polar solvent with suspended finely divided insoluble ion exchange material particles of less than ten microns in diameter having a polarity opposite that of the dye salt to the extent of at least 5 parts dye by weight per 95 parts by weight of dry ion exchange material, and recovering the resulting pigment particles having the insolubility characteristics of the ion exchange material and the color properties of the original ionized dye salt.

2. The process of claim 1 wherein the solvent is water.

3. The process of claim 1 wherein the solvent is a lower alkanol.

4. The method of forming a substantially insoluble organic pigment which comprises reacting a dye salt selected from the group consisting of cationic and anionic organic dye salts dissolved in a polar solvent with suspended finely divided insoluble synthetic organic ion exchange resin particles of less than 10 microns in diameter having a polarity opposite that of the dye salt to the extent of at least 5 parts dye by weight per 95 parts by weight of dry resin, and recovering the resulting pigment particles having the insolubility characteristics of the ion exchange material and the color properties of the original ionized dye salt.

5. The method of forming a substantially insoluble organic pigment which comprises reacting ionizable cationic organic dye salt dissolved in a polar solvent with suspended finely divided insoluble synthetic cation exchange organic resin particles of less than ten microns in diameter to the extent of at least 5 parts by weight of dye per 95 parts by weight of dry resin, and recovering the resulting pigment particles having the insolubility characteristics of the ion exchange material and the color properties of the original ionized dye salt.

6. The process of claim 5 wherein the resin is a sulfonated cross-linked copolymer of styrene and divinylbenzene.

7. The process of claim 5 wherein the resin is a sulfonated cross-linked copolymer of styrene and ethylenedimethacrylate.

8. The process of claim 5 wherein the active cation exchange group of the resin is a carboxylic group.

9. The process of claim 5 wherein the active cation exchange group of the resin is phosphoric acid group.

10. The process of claim 5 wherein the active cation exchange group of the resin is a phosphonous acid group.

11. The process of claim 5 wherein the active cation exchange group of the resin is a phosphonic acid group.

12. The process of claim 5 wherein the resin is a sulfonated phenolformaldehyde resin.

13. The process of claim 5 wherein the resin is a sulfonated bituminous coal.

14. The method of forming a substantially insoluble organic pigment which comprises reacting an aqueous solution of a water-soluble ionizable anionic organic dye salt with suspended finely divided insoluble synthetic anion exchange organic resin particles of less than ten microns in diameter to the extent of at least 5 parts by weight of dye to 95 parts by weight of dry resin, and recovering the resulting pigment particles having the insolubility characteristics of the ion exchange material and the color properties of the original ionized dye salt.

15. The process of claim 14 wherein the resin is the quaternary ammonium salt of the chloromethylated copolymer of styrene and divinylbenzene.

16. The process of claim 14 wherein the resin is a linear polystyrene which has been cross-linked after polymerization, and the anion exchange group is the quaternary ammonium group which has been attached to active side chains in the polymer.

17. The process of claim 14 wherein the resin is of the epoxy-polyamine type, and whose active ion exchange groups are the tertiary amine and the quaternary ammonium groups.

18. The method of forming a substantially insoluble fluorescent organic pigment which comprises reacting an ionizable fluorescent organic dye salt dissolved in a polar solvent with suspended finely divided insoluble synthetic ion exchange particles of less than ten microns in diameter having a polarity opposite that of the dye salt to the extent of at least 5.0 parts of dye to 95.0 parts by weight of dry resin, and recovering the resulting pigment particles having the insolubility characteristics of the ion exchange material and substantially the fluorescence properties of the original ionized dye salt.

19. A substantially insoluble organic pigment comprising at least 5% on a dry weight basis of an ionizable salt of an organic dye with an insoluble ion exchange particle material of less than ten microns in diameter having the insolubility characteristics of the ion exchange material and the color properties of the original dye.

20. A substantially insoluble organic pigment comprising at least 5% on a dry weight basis of an ionizable salt of an organic dye with an insoluble synthetic organic ion exchange resin particles of less than ten microns in diameter having the insolubility characteristics of the ion exchange material and the color properties of the original dye.

21. An insoluble organic pigment composed of at least 5% by weight of a basic organic dye with particles of a sulfonated cross-linked copolymer of styrene and divinylbenzene of less than ten microns in diameter.

22. An insoluble organic pigment composed of at least 5% by weight of a basic organic dye with particles of a carboxylated copolymer of acrylic acid and divinylbenzene of less than ten microns in diameter.

23. An insloubie organic pigment composed of at least 5% by weight of a basic organic dye with particles of a sulfonated phenolic resin of less than ten microns in diameter.

24. An insoluble organic pigment composed of at least 5% by weight of a basic organic dye with particles of a cross-linked copolymer of styrene and divinylbenzene having a phosphonous acid active ion exchange group of less than ten microns in diameter.

25. An insoluble organic pigment composed of at least 5% by weight of a basic organic dye with particles of a cross-linked copolymer of styrene and divinylbenzene having a phosphonic acid active ion exchange group of less than ten microns in diameter.

26. An insoluble organic pigment composed of at least 5% by weight of a basic organic dye with particles of a cross-linked copolymer of styrene and divinylbenzene having a phosphoric acid active ion exchange group of less than ten microns in diameter.

27. An insoluble organic pigment composed of at least 5% by weight of particles of a basic organic dye with sulfonated bituminous coal of less than ten microns in diameter.

28. An insoluble organic pigment composed of at least 5% by weight of a basic organic dye with particles of a cross-linked copolymer of styrene and divinylbenzene having a sulfonium active ion exchange group of less than ten microns in diameter.

29. An insoluble organic pigment composed of at least 5% by weight of an acidic organic dye and particles of a quaternary ammonium salt of a chloromethylated copolymer of styrene and divinylbenzene of less than ten microns in diameter.

30. An insoluble organic pigment composed of at least 5% by weight of an acidic organic dye and particles of a quaternary ammonium salt of a cross-linked polystyrene resin of less than ten microns in diameter.

31. An insoluble organic pigment composed of at least 5% by weight of an acidic organic dye and particles of a phenolic resin having an active ion exchange group selected from the group consisting of primary, secondary, or tertiary amine groups and their mixtures of less than ten microns in diameter.

32. An insoluble organic pigment composed of at least 5% by weight of an acidic organic dye with particles of an epoxy-polyamine resin having tertiary amine and quaternary ammonium active ion exchange groups of less than ten microns in diameter.

References Cited by the Examiner

UNITED STATES PATENTS 2,778,798  1/57  Klumb _____ 260—2.1
2,938,873  5/60  Kazenas _____ 252—301.2

OTHER REFERENCES

Segal: Annals of New York Academy of Sciences, vol. 57, pp. 308–323, 1953.

Richardson: J. Chem. Soc., 1951, pp. 910–914.

WILLIAM H. SHORT, *Primary Examiner.*

NORMAN TORCHIN, *Examiner.*